US007292714B2

United States Patent
Seissler

(10) Patent No.: US 7,292,714 B2
(45) Date of Patent: Nov. 6, 2007

(54) METHOD, DEVICE AND SOFTWARE FOR SEPARATING THE INDIVIDUAL SUBJECTS OF AN ANATOMICAL STRUCTURE SEGMENTED FROM 3D DATASETS OF MEDICAL EXAMINATION PROCEDURES

(75) Inventor: Wolfgang Georg Seissler, deceased, late of Uttenreuth (DE); by Ingeborg Seissler, legal representative, Uttenreuth (DE); by Paul Seissler, legal representative, Uttenreuth (DE); by Jakob Seissler, legal representative, Uttenreuth (DE); by Anke Seissler, legal representative, Uttenreuth (DE); by Sandra Schramm, legal representative, Uttenreuth (DE)

(73) Assignee: Siemens Aktiengesellschaft, Munich (DE)

( * ) Notice: Subject to any disclaimer, the term of this patent is extended or adjusted under 35 U.S.C. 154(b) by 882 days.

(21) Appl. No.: 10/380,257

(22) PCT Filed: Aug. 20, 2001

(86) PCT No.: PCT/DE01/03313

§ 371 (c)(1),
(2), (4) Date: Aug. 6, 2003

(87) PCT Pub. No.: WO02/21452

PCT Pub. Date: Mar. 14, 2002

(65) Prior Publication Data
US 2004/0022424 A1    Feb. 5, 2004

(30) Foreign Application Priority Data
Sep. 11, 2000    (DE) ............................... 100 44 844

(51) Int. Cl.
*G06K 9/00* (2006.01)

(52) U.S. Cl. ..................... 382/128; 382/164; 382/173; 382/177

(58) Field of Classification Search ................ 382/128, 382/129, 130, 131, 132, 133, 134, 164, 171, 382/173, 177; 378/5, 62, 98.12; 600/372, 600/407, 425, 431, 443, 449, 507, 587; 128/922
See application file for complete search history.

(56) References Cited

U.S. PATENT DOCUMENTS

| 4,551,800 A | * | 11/1985 | Riederer et al. ............. 600/407 |
| 5,623,586 A | * | 4/1997 | Hohne ......................... 345/424 |
| 5,690,106 A | * | 11/1997 | Bani-Hashemi et al. .... 600/425 |
| 6,366,800 B1 | * | 4/2002 | Vining et al. ................ 600/425 |
| 6,819,790 B2 | * | 11/2004 | Suzuki et al. ................ 382/156 |

FOREIGN PATENT DOCUMENTS

EP    0 549 182    6/1993

OTHER PUBLICATIONS

"Fast Visualization, Manipulation, and Analysis of Binary Volumetric Objects," Udupa et al., IEEE Computer Graphics and Applications, Nov. 1991, pp. 53-62.

(Continued)

*Primary Examiner*—Samir Ahmed
*Assistant Examiner*—Abolfazl Tabatabai
(74) *Attorney, Agent, or Firm*—Schiff Hardin LLP

(57) ABSTRACT

The invention relates to a method for carrying out the imaging processing of data sets of three-dimensional characters obtained from medical examination methods. According to the invention, a separation of the data of relevant anatomic structures as well as of other structures is carried out based on data provided in the form of volume elements. In addition, a spatial representation of at least one structure of interest ensues, and the individual objects of the structure of interest are separated from one another in such a manner that enables them to be repositioned in the spatial representation.

15 Claims, 3 Drawing Sheets

OTHER PUBLICATIONS

"Simulating Motion of Anatomical Objects with Volume-Based 3D-Visualization," Robb, Ed., Biomedical Computing, Proc. SPIE 2359, 1994, pp. 291-300.

"An Algorithm for Removing Sections of Bone from X-Ray CT Models," Suto et al., Systems and Computers in Japan, Scripta Technical Journals, vol. 22, No. 3 (1991) pp. 94-107.

* cited by examiner

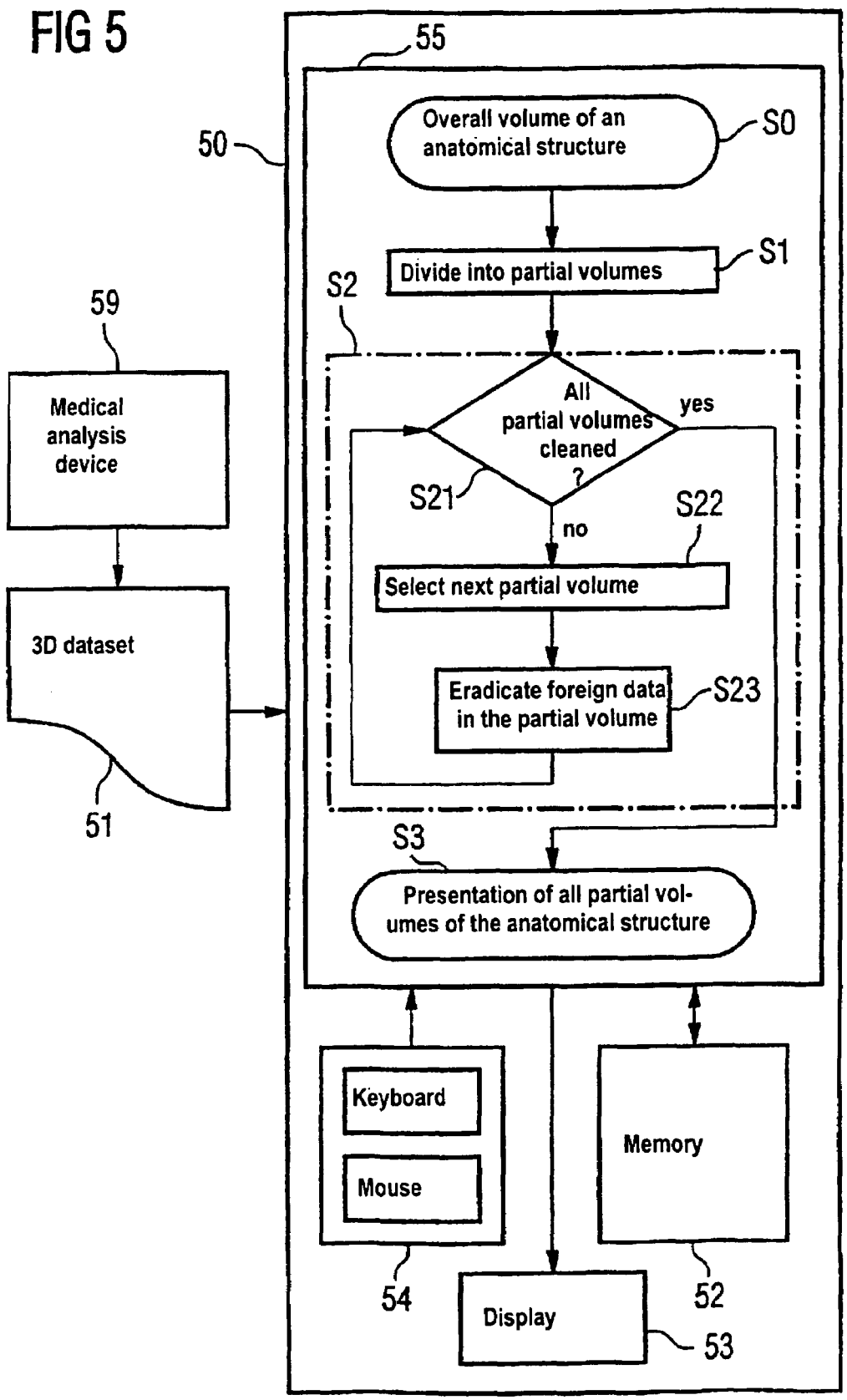

METHOD, DEVICE AND SOFTWARE FOR SEPARATING THE INDIVIDUAL SUBJECTS OF AN ANATOMICAL STRUCTURE SEGMENTED FROM 3D DATASETS OF MEDICAL EXAMINATION PROCEDURES

BACKGROUND OF THE INVENTION

1. Field of the Invention

The invention is directed to a method, a device and a software product for the medical image processing of datasets of a three-dimensional character acquired from medical examination procedures, of the type wherein a separation of the data of relevant anatomical structures as well as of other structures is undertaken proceeding from data in the form of volume element, and a spatial presentation of at least one structure of interest ensues.

2. Description of the Prior Art

The human ability to conceptualize quickly reaches it limits in the spatial interpretation of the information from X-ray exposures or from tomograms as acquired with modern tomographic methods. Modern methods of medical image processing therefore convert the information of a three-dimensional character acquired in medical examinations into spatial impressions of the inside of the body. In general, however, it is not adequate to merely convey a spatial impression of the displayed body region to the medical practitioner. For preparing a reliable diagnosis or for planning a therapeutic measure or a surgical intervention, however, the medical practitioner needs a reduction of the displayed data to what is essential to the practitioner. In other words, the subject of the practitioner's interest must clearly contrast with the environment having only secondary informational content. A number of methods were developed for this purpose that enable an allocation of individual measure values to relevant anatomical structures such as, for example, nerves or fat tissue, bones or tissue equivalent to muscle, as well as to non-anatomical structures such as, for example, foreign bodies. These methods are referred to as segmenting and form the pre-condition allowing a medical practitioner to view, for example, the bone structure of a patient at the picture screen isolated from other tissues.

For planning a surgical intervention, for example after an accident resulting in a complicated fracture, however, this form of presentation of the examination results is often inadequate since although it reflects the actual condition of the structure of interest it does not allow a manipulation of the data with respect to measures to be undertaken; the individual subjects within each and every structure remain fixed in their geometrical arrangement relative to one another in known segmenting methods. The preparation for an intervention to treat a complex multiple fracture therefore requires an enormous mental effort on the part of the orthopedist since he or she cannot verify the allocation of the various fracture surfaces and thus bone fragments to one another at the picture screen.

"Fast Visualization, Manipulation, and Analysis of Binary Volumetric Objects", IEEE Computer Graphics and Applications, November 1991, pages 53-62, proposes a method for splitting an anatomical structure into two components along a plane to be arbitrarily defined. The separated components can be repositioned in space independently of the original structure.

In "Simulating Motion of Anatomical Objects with Volume-Based 3D-Visualization", R. A. Robb (Editor): Visualization in Biomedical Computing, Proc. SPIE 2359, 1994, pages 291-300, B. Plesser, U. Thiede and K. H. Höhne propose the division of an anatomical subject into partial subjects that can be subsequently converted into a new spatial arrangement.

SUMMARY OF THE INVENTION

It is an object of the present invention to provide a method and an apparatus for separating an anatomical structure into its individual subjects, so that these can be arbitrarily re-arranged independently from one another in the spatial presentation either individually and/or in groups.

This object is achieved in a method, an apparatus and a software product for imaging processing of datasets with a three-dimensional character that are obtained from medical examination procedures, wherein a separation of the data of relevant anatomical structure as well as other structures is undertaken proceeding from data in the form of volume elements and a spatial presentation of at least one structure of interest is undertaken, and wherein at least one of the individual subjects of the structure of interest is separated such that the individual subject can be re-positioned in the spatial presentation. A segmenting or separation of the individual subjects from one another ensues by dividing the overall volume of the anatomical structure into partial volumes in a first step, with an individual subject being completely contained in the partial volume allocated to it. All other data not to be considered as belonging to this individual subject are removed from this partial volume in a second step. The resultant data of each partial volume processed in this way are stored in a third step.

Time-consuming procedures thus can be shifted from the operation into the planning phase. The precise planning of an intervention in the preparatory phase of the operation not only shortens the duration of the intervention and, thus, produces less stress on the patient, but also enables more precise and safer work for the medical practitioner during the operation. Also advantageously, the use of suitable aids such as, for example, screws, nails, etc., can already be tested before the operation. Likewise advantageously, implants can now be pre-shaped according to the identifiable conditions on the basis of the present invention and no longer need be intuitively designed during the course of the operation.

In an embodiment of the invention, the partial volumes have the shape of a cuboid, as a result of which the individual volumes can be easily joined. Together with the data of each partial volume, the appertaining coordinate information are also stored. The editing of 3D computer tomography datasets is particularly advantageous, so the selection of a bone structure as a structure of interest, with the individual bones and/or bone fragments as individual subjects of the structure to be segmented, is especially advantageous.

DESCRIPTION OF THE DRAWINGS

FIG. 5 is a block diagram of the apparatus of the invention which also illustrates the method of the invention.

DESCRIPTION OF THE PREFERRED EMBODIMENTS

Figure 1:
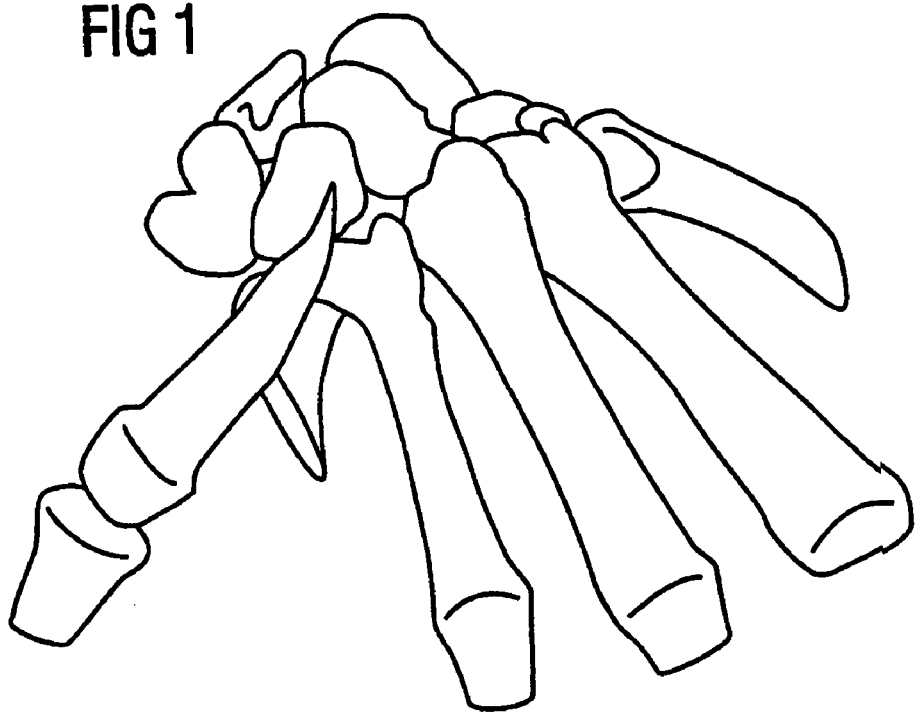
FIG. 1 is a schematic 3D illustration of the osseous structure of a wrist joint with a fracture and dislocation of the os metacarpal V, formed from a 3D computed tomography (CT) dataset.

FIG. 1 provides a conceptualization of the graphic representation of a computer-tomographic 3D dataset as is currently available to a surgeon. In practice, the data are visualized by means of a method referred to as volume rendering, wherein the surface of the identified osseous structure is presented with a suitably calculated distribution of light and shadow so that it conveys a plastic impression of the underlying spatial structure to the viewer or the surgeon.

A bone fracture with a dislocated fragment of the os metacarpal V can be clearly recognized in the left half of FIG. 1. The relative position of this bone fragment with respect to the other subjects of the graphically visualized structure cannot be modified at this initial stage S0 of the inventive method since the structure for a single, interconnected subject in this stage as established by the standard methods of medical image processing. Although a viewer has the possibility of examining details such as, for example, fracture surfaces in greater detail by selecting a suitable angle of view, inspecting the two fracture surfaces for a form-fit requires an ability of the viewer to conceptualize that cannot always be assumed.

An assessment as to whether the two fracture surfaces can be seamlessly joined to one another assumes that the two fragments of the broken bone can be aligned and positioned independently of one another. After segmentation of the dataset into anatomical structures, however, the illustrated bone structure is obtained as an interconnected subject. The subdivision into the discrete subjects of the structure that is unconsciously performed by the viewer, into bones and bone fragments in the present example, is not reduplicated by the conventionally available segmenting methods.

In order to achieve a further segmenting of the structures within an anatomical structure, the existing 3D CT dataset is first resolved into separate volumes according to method step S1 in FIG. 5, each of these volumes completely containing a complete sub-structure or a discrete subject. In the aforementioned example, thus, such a partial volume comprises an individual bone or an individual bone fragment. To that end, each discrete subject identified in the 3D CT dataset is advantageously circumscribed by a cuboid in conformity with its spatial expanse.

Figure 2:
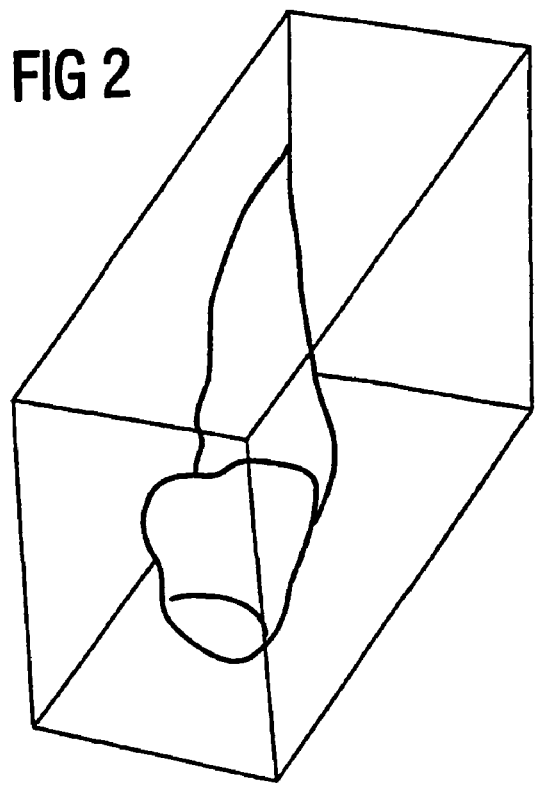
FIG. 2 is an empirically produced partial volume from the dislocated bone fragment in FIG. 1.

Many individual subjects are in immediate proximity to one another, for which reason component parts of neighboring subjects are also generally contained in the individual partial volumes in addition to the desired individual subject. In the next step S2, the partial volumes are therefore cleaned in that the data of the neighboring subjects are eradicated in each of the partial volumes until the described partial volume ultimately contains only the individual subject allocated to it, the dislocated bone fragment in the example of FIG. 2. Advantageously, the data partial volumes produced in this way are stored together with the coordinate information allocated to them.

This advanced segmenting is implemented for all bones or, respectively, bone fragments of the 3D CT dataset S21, S22 and S23 so that the original dataset can be presented from the sum of the data partial volumes that are generated.

The visual presentation of this sum S3 is initially the same as before the beginning of the segmentation of the anatomical structure into its isolatable subjects.

However, the fixed geometrical reference of the discrete subjects relative to one another has been eliminated at this point in the method.

Figure 3:
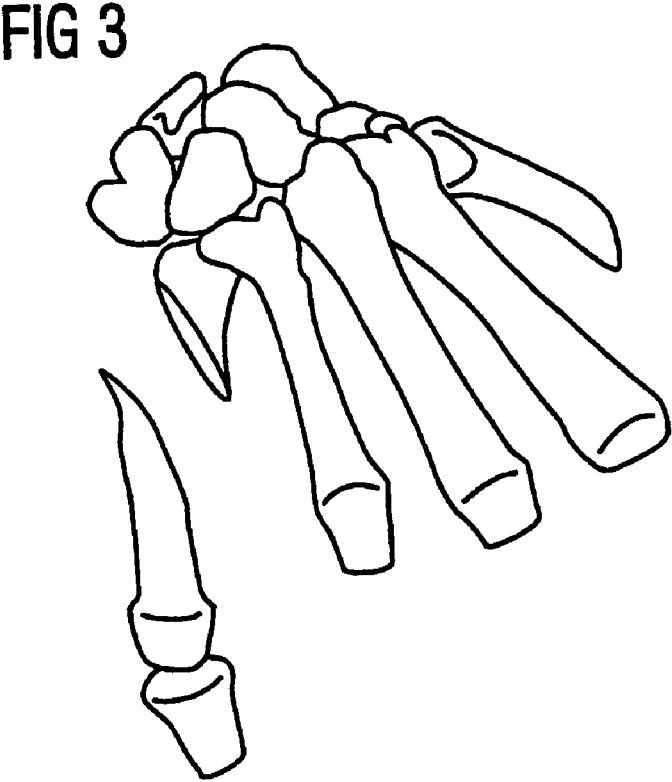
FIG. 3 shows the dislocated bone fragment in FIGS. 1 and 2 aligned relative to the second fragment of the os metacarpal V so that the fracture surfaces are parallel to and opposite from each other.
Figure 4:
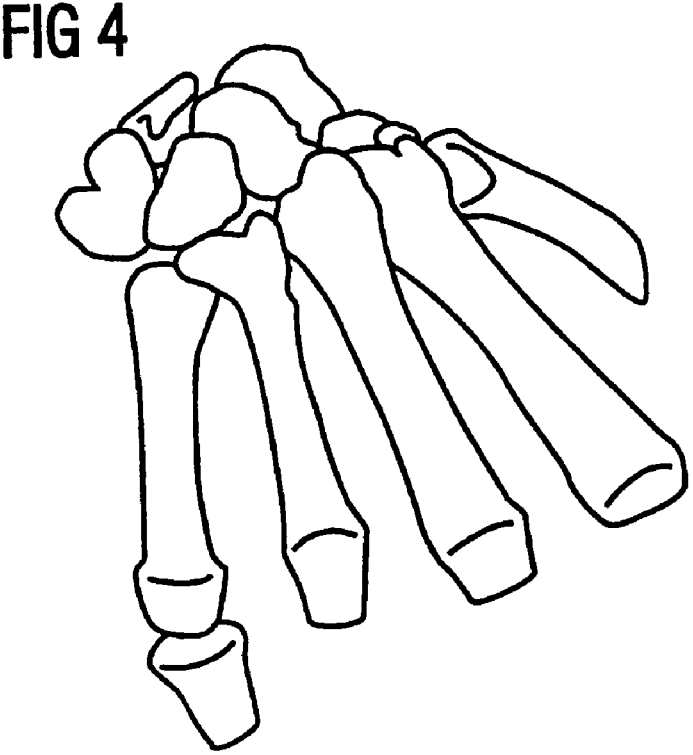
FIG. 4 shows the osseous structure of FIG. 1 with the bone fragments virtually joined in the image at the fracture surfaces.

As can be seen in the result thereof, for example in FIG. 3, the individual subjects can now be individually selected and newly aligned. In this presentation, the dislocated bone fragment is aligned such that the two fracture surfaces reside parallel opposite one another. Compared to this illustration, the bone fragment was displaced farther in FIG. 4, so that the two fracture surfaces have been brought into coincidence. It is only the inventive segmenting of the original 3D CT dataset that makes this virtual repositioning of bone fragments possible.

FIG. 5 outlines the implementation of the described method in an apparatus 50 for medical image processing. The 3D dataset supplied by the medical analysis device in an examination is transmitted to the apparatus 50. The transmission can ensue arbitrarily, for example with the assistance of a data carrier or via a data bus or, respectively, a network. The further-processing of the dataset with the processing device 55 ensues according to method steps S0 through S3. Proceeding from the anatomical structure S0 that has already been segmented, the volume covering this structure is divided into a plurality of partial volumes in the first method step S1, whereby each partial volume completely envelopes a discrete subject of the structure of interest. The cleaning S2 ensues for all partial volumes S1 and S2 in that all data not belonging to the discrete subject of a partial volume are eradicated therefrom S23. Finally, all partial volumes and, thus, all discrete subjects of the anatomical structure of interest are displayed S3 on the display device 53. The operator can influence the presentation via commands or control signals that are given to the processing device via an input device. The memory device 52 accepts the original datasets and the data that arise during the course and as a result of the described image processing process.

Although modifications and changes may be suggested by those skilled in the art, it is the invention of the inventor to embody within the patent warranted heron all changes and modifications as reasonably and properly come within the scope of his contribution to the art.

I claim as my invention:

1. A method for processing three-dimensional image datasets obtained from a medical examination procedure, said datasets representing an anatomical structure and other structures, comprising the steps of:

in said datasets, separating data representing volume elements of said anatomical structure from data representing volume elements of said other structures;

generating a spatial presentation of at least one structure of interest, comprising a plurality of individual subjects; and separating at least one of said individual subjects in said structure of interest by allocating a partial volume to said at least one of said individual subjects which completely surrounds said at least one of said individual subjects, removing all data in said structure of interest which are not allocated to said partial volume, and storing said data allocated to said partial volume, allowing selective positioning of said at least one of said individual subjects in said spatial presentation.

2. A method as claimed in claim 1 wherein the step of allocating a partial volume to said at least one of said individual subjects comprises allocating a cuboid partial volume to said at least one of said individual subjects which completely surrounds said at least one of said individual subjects.

3. A method as claimed in claim 1 comprising storing said data representing said partial volume together with associated coordinate information.

4. A method as claimed in claim 1 comprising employing three-dimensional computed tomography datasets as said three-dimensional image datasets.

5. A method as claimed in claim 1 wherein said three-dimensional image datasets represent an osseous structure containing at least one of bones and bone fragments and selecting said osseous structure as said structure of interest and at least one of said bones and bone fragments as said at least one of said individual subjects.

6. An apparatus for processing three-dimensional image datasets acquired from a medical examination procedure, comprising:
a computer which, in said datasets, separates data representing volume elements of said anatomical structure from data representing volume elements of said other structures, generates a spatial presentation of at least one structure of interest, comprising a plurality of individual subjects, and separates at least one of said individual subjects in said structure of interest by allocating a partial volume to said at least one of said individual subjects which completely surrounds said at least one of said individual subjects, and removes all data in said structure of interest which are not allocated to said partial volume; and
a memory which stores said data allocated to said partial volume, allowing selective positioning of said at least one of said individual subjects in said spatial presentation.

7. An apparatus as claimed in claim 6 wherein said computer, for allocating a partial volume to said at least one of said individual subjects, allocates a cuboid partial volume to said at least one of said individual subjects which completely surrounds said at least one of said individual subjects.

8. An apparatus as claimed in claim 6 wherein said memory stores said data representing said partial volume together with associated coordinate information.

9. An apparatus as claimed in claim 6 wherein said computer employs three-dimensional computed tomography datasets as said three-dimensional image datasets.

10. An apparatus as claimed in claim 6 wherein said three-dimensional image datasets represent an osseous structure containing at least one of bones and bone fragments and wherein said computer selects said osseous structure as said structure of interest and at least one of said bones and bone fragments as said at least one of said individual subjects.

11. A computer-readable medium encoded with a data structure for processing three-dimensional image datasets acquired from a medical examination procedure said data structure when said medium is loaded into a processor, programming said processor to:
in said datasets, separate data representing volume elements of said anatomical structure from data representing volume elements of said other structures;
generate a spatial presentation of at least one structure of interest, comprising a plurality of individual subjects; and
separate at least one of said individual subjects in said structure of interest by allocating a partial volume to said at least one of said individual subjects which completely surrounds said at least one of said individual subjects, remove all data in said structure of interest which are not allocated to said partial volume, and store said data allocated to said partial volume, allowing selective positioning of said at least one of said individual subjects in said spatial presentation.

12. A computer-readable program as claimed in claim 11 wherein, for programming said processor to allocate a partial volume to said at least one of said individual subjects, said program data structure programs said processor to allocate a cuboid partial volume to said at least one of said individual subjects which completely surrounds said at least one of said individual subjects.

13. A computer-readable medium as claimed in claim 11, wherein said data structure programs a processor to store said data representing said partial volume together with associated coordinate information.

14. A computer-readable medium as claimed in claim 11 wherein said data structure operates on three-dimensional computed tomography datasets as said three-dimensional image datasets.

15. A computer-readable medium as claimed in claim 11 wherein said three-dimensional image datasets represent an osseous structure containing at least one of bones and bone fragments and wherein said data structure programs said processor to select said osseous structure as said structure of interest and at least one of said bones and bone fragments as said at least one of said individual subjects.

* * * * *